US006953287B2

(12) United States Patent
Cox

(10) Patent No.: US 6,953,287 B2
(45) Date of Patent: Oct. 11, 2005

(54) ANCHOR FOR FIBER OPTIC CABLE

(75) Inventor: Larry R. Cox, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/702,345

(22) Filed: Nov. 6, 2003

(65) Prior Publication Data

US 2005/0100303 A1 May 12, 2005

(51) Int. Cl.$^7$ .................................................. G02B 6/38
(52) U.S. Cl. ........................................................ 385/86
(58) Field of Search ............................... 385/86, 87, 88, 385/92, 100

(56) References Cited

U.S. PATENT DOCUMENTS

| | | | |
|---|---|---|---|
| 4,339,171 A | 7/1982 | Makuch et al. | |
| 4,447,120 A | 5/1984 | Borsuk | |
| 4,626,067 A | 12/1986 | Watson | |
| 4,795,229 A * | 1/1989 | Abendschein et al. | 385/87 |
| 4,815,810 A | 3/1989 | Betzler et al. | |
| 4,948,222 A * | 8/1990 | Corke et al. | 385/100 |
| 5,185,840 A | 2/1993 | Iapicco | |
| 5,199,095 A | 3/1993 | Iapicco | |
| 5,371,827 A * | 12/1994 | Szegda | 385/136 |
| 5,491,766 A | 2/1996 | Huynh et al. | |
| 5,514,055 A | 5/1996 | Elliott | |
| 5,559,917 A * | 9/1996 | Ott | 385/86 |
| 5,615,293 A | 3/1997 | Sayegh | |
| 5,745,633 A * | 4/1998 | Giebel et al. | 385/136 |
| 5,838,861 A | 11/1998 | Bunde | |
| 5,892,871 A | 4/1999 | Dahan et al. | |
| 5,895,079 A | 4/1999 | Carstensen et al. | |
| 5,903,693 A | 5/1999 | Brown | |
| 5,970,195 A | 10/1999 | Brown | |
| 6,049,647 A | 4/2000 | Register et al. | |
| 6,278,831 B1 | 8/2001 | Henderson et al. | |
| 6,356,690 B1 | 3/2002 | McAlpine et al. | |
| 6,389,214 B1 | 5/2002 | Smith et al. | |
| 6,400,873 B1 | 6/2002 | Gimblet et al. | |

(Continued)

FOREIGN PATENT DOCUMENTS

EP        0 131 283        1/1985

(Continued)

OTHER PUBLICATIONS

Fiber Optic ST* and FC Connectors, Termination Procedures for Single -Mode and Multimode Field Mountable Connectors, Instructions, 3M Company, Austin TX, Apr. 1995, Issue 1, pp. 1–20.

(Continued)

Primary Examiner—Thanh-Tam Le
(74) Attorney, Agent, or Firm—Melanie G. Gover; James J. Trussell

(57) ABSTRACT

An anchored fiber optic cable and housing assembly. The fiber optic cable includes a strength member and a jacket around the strength member. The anchor is mounted on the cable. The anchor includes an inner sleeve and an outer sleeve. The strength member extends from the end of the cable and is structurally engaged with the anchor. The housing includes an anchor cavity and a cable inlet. The anchor cavity includes a first shoulder for engaging with the anchor. The anchor is mounted in the housing cavity and the cable extends through the cable inlet. The anchor cavity shoulder is engaged with the anchor to prevent the anchor from exiting the housing through the cable inlet. An anchored cable is also described, as are methods for anchoring the cable and for mounting the anchored cable in the housing. The fiber optic cable may include an optical fiber.

14 Claims, 2 Drawing Sheets

U.S. PATENT DOCUMENTS

| | | |
|---|---|---|
| 6,419,399 B1 | 7/2002 | Loder et al. |
| 6,421,495 B1 | 7/2002 | Hoffmeister et al. |
| 6,438,299 B1 | 8/2002 | Brown et al. |
| 6,485,196 B2 * | 11/2002 | Shiino et al. ............... 385/87 |
| 6,496,625 B1 | 12/2002 | Falkowich et al. |
| 6,519,395 B1 | 2/2003 | Bevan et al. |
| 6,556,754 B2 | 4/2003 | Simmons et al. |
| 6,769,817 B2 * | 8/2004 | Saito et al. ............... 385/90 |
| 2002/0122653 A1 | 9/2002 | Donaldson et al. |
| 2003/0021575 A1 | 1/2003 | Werkheiser et al. |
| 2003/0063867 A1 | 4/2003 | McDonald et al. |
| 2003/0063868 A1 | 4/2003 | Fentress |
| 2003/0063869 A1 | 4/2003 | Elkins et al. |

FOREIGN PATENT DOCUMENTS

| | | |
|---|---|---|
| EP | 0 256 710 | 2/1988 |
| EP | 0 512 811 A1 | 11/1992 |
| EP | 0 563 995 A1 | 10/1993 |
| EP | 0 779 527 A2 | 6/1997 |
| EP | 1 245 980 A2 | 10/2002 |
| FR | 2 512 218 | 3/1983 |
| GB | 2 032 130 A | 4/1980 |
| GB | 2 110 834 A | 6/1983 |
| WO | WO 03/087913 A1 | 10/2003 |

OTHER PUBLICATIONS

3M Brand Biconic Connectors, Instruction Manual, Termination Procedures for Single-Mode and Multimode Field Mountable Connectors, 3M Fiber Optic Products, 1989.

U.S. Application entitled "Anchor for Fiber Optic Cable", filed Nov. 6, 2003, having U.S. Appl. No. 10/702,330.

U.S. Application entitled "Anchor for Fiber Optic Cable", filed Nov. 6, 2003, having U.S. Appl. No. 10/702,826.

International Search Report for PCT/US2004/031576.

* cited by examiner

ANCHOR FOR FIBER OPTIC CABLE

FIELD OF INVENTION

The present invention relates to an anchor for a fiber optic cable and a method of assembly. In particular, the present invention pertains to an anchor for a fiber optic cable that structurally engages a strength member in the cable and is conveniently mounted in a desired housing.

BACKGROUND

It is a common practice to attach fiber optic cables to various housings, connectors, or other optical devices. It is also known to structurally engage the strength member of the optical fiber to the fiber optic assemblies to provide a so-called "ruggedized" assembly. While methods and devices described in the art may be useful in various applications, there is a continuing need to develop other devices and methods that can easily be applied and mounted.

SUMMARY

Disclosed herein are an anchor for use with an optical cable, an anchored cable, and an anchored cable and housing assembly, along with methods of anchoring the cable and mounting the anchored cable in a housing. The anchor is structurally engaged with a strength member in the optical cable. The anchor may be conveniently mounted on the cable prior to mounting the cable in the housing.

In one aspect, the present invention relates to an anchored fiber optic cable and housing assembly. The assembly comprises: a fiber optic cable comprising a strength member and a jacket around the strength member, wherein the cable includes a first end and a second end; an anchor mounted on the cable at the first end, the anchor including an inner sleeve and an outer sleeve, wherein the strength member includes a first end at the first end of the cable structurally engaged with the anchor; and a housing, the housing comprising an anchor cavity and a cable inlet, the anchor cavity comprising a first shoulder for engaging with the anchor, wherein the anchor is mounted in the housing cavity and the cable extends through the cable inlet, and wherein the anchor cavity first shoulder is engaged with the anchor to prevent the anchor from exiting the housing through the cable inlet. The fiber optic cable may include an optical fiber in the jacket.

In another aspect, the present invention relates to an anchored fiber optic cable assembly. The assembly comprises: a fiber optic cable comprising a strength member and a jacket around the strength member, wherein the cable includes a first end and a second end; and an anchor mounted on the cable at the first end, the anchor including an inner sleeve and an outer sleeve. The inner sleeve includes a first end, a second end, and an optical fiber passage extending through the inner sleeve; the inner sleeve second end extending within the cable jacket at the cable first end such that the strength member extends between the inner sleeve and the jacket. The outer sleeve includes a cable passage extending through the outer sleeve, and the outer sleeve is mounted on the cable first end over the cable jacket with the cable extending through the cable passage, and the anchor outer sleeve overlaps at least a portion of the inner sleeve. The cable passage is sized, prior to being mounted on the cable, so as to compress the cable jacket and the strength member between the inner and outer sleeves where the outer sleeve overlaps the inner sleeve, such that the strength member is structurally engaged with the anchor. The fiber optic cable may include an optical fiber in the jacket.

In yet another aspect, the present invention relates to a method of anchoring a fiber optic cable in a housing, wherein the cable comprises a strength member and a jacket around the strength member, and wherein the housing comprises an anchor cavity, a cable inlet, and an optical fiber outlet. The method comprises the steps of: placing an anchor inner sleeve within the jacket at the first end of the cable; placing an anchor outer sleeve over the jacket and thereby structurally engaging the strength member by compressive force between the anchor inner and outer sleeves; thereafter mounting the anchor in the cavity of the housing such that the cable extends through the cable inlet of the housing, wherein the anchor and housing are configured such that the anchor cannot exit through the cable inlet. The fiber optic cable may include an optical fiber in the jacket.

As used herein, a "fiber optic cable" comprises at least one optically transmissive core, typically a glass core, each core surrounded by cladding. A buffer coating typically surrounds the core/cladding combination. A buffer tube typically surrounds the core/cladding, and can be either a tight or loose buffer tube as determined by its fit over the core. A protective jacket surrounds the buffer tube. A strength member is included within the jacket alongside the buffer tube. A fiber optic cable may contain more than one glass core and cladding. Information and data, packaged in the form of light waves, travels the length of the glass core. Thus, the glass core serves as the communication channel. The term "optical fiber" refers to the combination of the glass core, cladding, and buffer coating. As explained in more detail below, it may be desirable to remove the optical fiber from the fiber optic cable while mounting the anchor and cable. For convenience, the term "fiber optic cable" will be used herein to refer to the jacket and strength member, with or without an optical fiber present in the fiber optic cable.

The above summary of the present invention is not intended to describe each disclosed embodiment or every implementation of the present invention. The Figures and the detailed description, which follow more particularly exemplify illustrative embodiments.

BRIEF DESCRIPTION OF THE DRAWINGS

The present invention can be described with reference to the following figures, wherein.

These figures are idealized, not drawn to scale and are intended for illustrative purposes.

DETAILED DESCRIPTION

Figure 1:
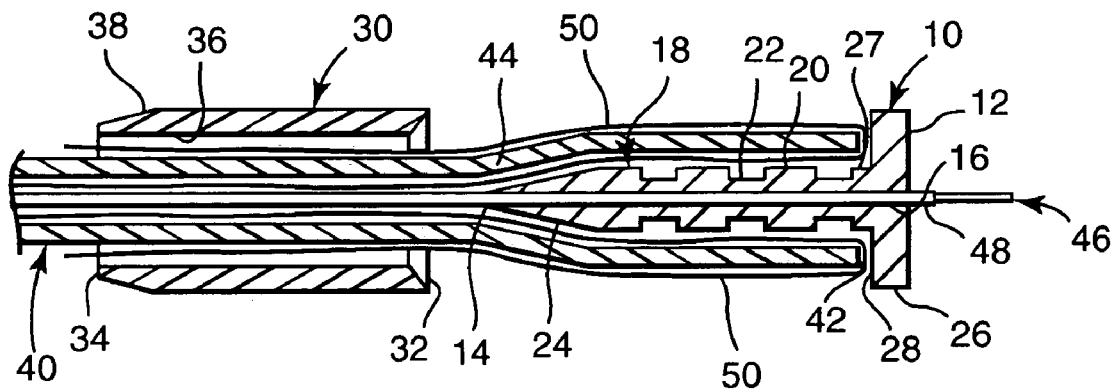
FIG. 1 is a cross sectional view of an exemplary anchor partially mounted on a fiber optic cable.
Figure 2:
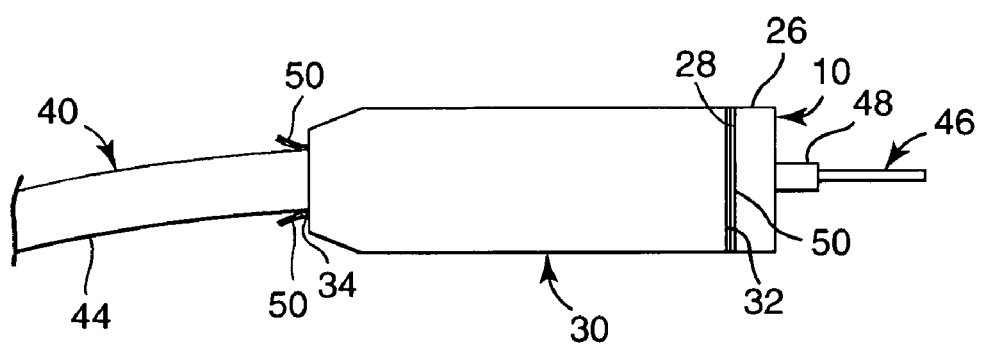
FIG. 2 is a top view of an exemplary anchor mounted on a fiber optic cable.

FIG. 1 shows an exemplary anchor for use with a fiber optic cable. As shown in FIG. 1, the anchor includes an inner sleeve 10 and an outer sleeve 30 for use with fiber optic cable 40. In FIG. 1, the anchor inner and outer sleeves are partially assembled on first end 42 of the fiber optic cable 40. In FIG. 2, the anchor inner and outer sleeves are completely assembled on the fiber optic cable.

The exemplary fiber optic cable 40 of FIG. 1 includes a protective jacket 44. Within the jacket 44 is optical fiber 46. The optical fiber 46 comprises an optically transmissive core, typically a glass core, surrounded by cladding (not illustrated). A buffer coating (not illustrated) typically surrounds the core/cladding combination. Optional buffer tube 48 surrounds the core, cladding and buffer of the optical fiber 46, and can be either a tight or loose buffer tube as determined by its fit. A strength member 50 is included within the jacket 44 alongside the buffer tube 48. A fiber optic cable 40 may contain more than one glass core and cladding. Information and data, packaged in the form of light waves, travels the length of the glass core. Thus, the glass core serves as the communication channel. Strength member 50 is selected to provide a high strength, low stretch component. In an exemplary embodiment, the strength member comprises a plurality of filaments. In one aspect the strength member comprises aramid fibers, such as Kevlar™ aramid fibers. The construction, manufacture and use of fiber optic cables is well known in the art, and need not be described in greater detail herein.

The exemplary anchor inner sleeve 10 of FIG. 1 is generally cylindrical. The inner sleeve includes a first end 12 and a second end 14. When mounted on the fiber optic cable 40, the first end of the inner sleeve faces in the direction of the first end 42 of the fiber optic cable, and the second end 14 of the inner sleeve faces in the direction of the opposite, second end of the fiber optic cable. The inner sleeve 10 includes an optical fiber passage 16 extending through the inner sleeve. The optical fiber passage 16 is sized and configured to allow the optical fiber 46, and optionally the buffer tube 48, to pass through the inner sleeve 10 from second end 14 to first end 12. The diameter of the optical fiber passage will be selected to allow the optical fiber 46 and buffer tube 48 to pass through, and will therefore depend on the diameter of the optical fiber and buffer tube. In an exemplary embodiment, the passage 16 will be up to 10% larger than the diameter of the buffer tube. In another exemplary embodiment, the passage 16 will be up to 15% larger than the diameter of the buffer tube. In another exemplary embodiment, the passage 16 will be at least 10% larger than the diameter of the buffer tube. In another exemplary embodiment, the passage 16 will be at least 15% larger than the diameter of the buffer tube.

The outer surface 18 of the inner sleeve 10 is generally cylindrical. Optionally, the outer surface may include a plurality of protrusions 20 and recesses 22 which will increase the strength of the engagement between the outer surface 18 of the inner sleeve 10 and the inside of the jacket 44. The outer surface 18 is sized and configured to allow it to be inserted within the jacket 44 of the fiber optic cable 40, with the strength member 50 between the inside of the jacket 44 and the outer surface 18 of the inner sleeve. The inner sleeve 10 may be tapered at the second end 14 to allow the inner sleeve to be conveniently inserted within the jacket 44 of the fiber optic cable 40. The diameter of the outer surface 18 (at the protrusions 20, if present) is selected to provide a snug fit inside the jacket. The diameter will depend on the size of the inside of the jacket and the size and configuration of the strength member. In an exemplary embodiment, the diameter of the outer surface is approximately the same size as the inner diameter of the jacket. In another exemplary embodiment, the diameter of the outer surface is up to 15% larger than the inner diameter of the jacket.

In the exemplary embodiment illustrated in FIG. 1, the inner sleeve 10 includes a flange 26 at the first end 12. The flange includes a flange wall 28 extending from the outer surface 18 of the inner sleeve 10 and facing the second end 14 of the inner sleeve. This results in a shoulder 27 at the outer surface 18 adjacent the flange wall 28. The flange 26 serves as a stop as the inner sleeve is inserted within the jacket of the fiber optic cable, and also provides a location at the flange wall to structurally engage the strength member 50. This engagement is discussed in greater detail below.

The exemplary embodiment of the outer sleeve 30 illustrated in FIG. 1 is generally cylindrical. The outer sleeve 30 includes a first end 32 facing the direction of the first end 42 of the fiber optic cable, and a second end 34 facing the second end of the cable. The outer sleeve includes a cable passage 36 extending through the outer sleeve. The cable passage allows the fiber optic cable to extend through the outer sleeve 30 from the second end 34 to the first end 32. The outer sleeve 30 also includes outer surface 38. The cable passage is sized and configured to allow the fiber optic cable to conveniently pass through, and to provide a desired degree of compression with the inner sleeve 10. When fully assembled, the outer sleeve will at least partially overlap the inner sleeve, with the jacket 44 and the strength member 50 of the fiber optic cable between the outer surface 18 of the inner sleeve and the inner surface 36 of the outer sleeve 30. The outer sleeve and inner sleeve may also engage the strength member 50 between the first end 32 of the outer sleeve and the flange wall 28 on the inner sleeve. Optionally, the strength member 50 may extend beyond the first end of the jacket 44 with a sufficient length to allow it to extend along the outside of the jacket towards the second end of the cable, and pass through the cable passage 36 along the outside of the jacket 44 as illustrated in FIG. 1. In another exemplary embodiment, the strength member extends from the first end of the jacket 44 and is engaged between the first end of the outer sleeve and the flange wall. In this exemplary embodiment, the strength member does not extend along the outside of the jacket within the cable passage 36.

An exemplary method of mounting the anchor on the fiber optic cable is as follows. The jacket 44 is trimmed or otherwise situated so as to allow a length of the strength member 50 to extend from the first end of the jacket. The outer sleeve 30 is inserted over the jacket, oriented with the first end 32 facing the first end of the cable. The buffer tube 48, if present, is inserted through the optical fiber passage 16 of the inner sleeve 10. The second end 12 of the inner sleeve 10 is inserted into the jacket 44 at the first end of the cable 40, with the strength member 50 extending along the outer surface 18 of the inner sleeve 10 and between the end of the jacket 44 and the flange wall 28. In an exemplary embodiment, the strength member comprises a plurality of filaments. The filaments may be distributed in a generally uniform manner around the shoulder 27 of the inner sleeve 10. Alternatively, the fibers may be grouped into one or more groupings arranged around the inner sleeve as desired. The inner sleeve is pushed into the jacket in the direction of the second end of the cable until the strength member 50 is engaged between the first end of the jacket and the flange wall.

In one option, the strength member 50 is then extended outside the jacket in the direction of the second end of the cable, and within the cable passage 36 of the outer sleeve. The outer sleeve is pushed forward over the jacket and strength member until the first end 32 of the outer sleeve extends close to or comes into contact with the flange wall 28 on the inner sleeve. Any length of strength member that may extend beyond the second end 34 of the outer sleeve (as seen in FIG. 2) may be trimmed as desired.

In another option, the strength member is maintained near the first end of the cable without passing within the cable passage 36 of the outer sleeve. The outer sleeve 36 is then pushed in the direction of the first end of the cable until the strength member 50 is engaged between the first end 32 of the outer sleeve 30 and the flange wall 28 on the inner sleeve 10. Any length of strength member extending between the flange and the outer sleeve may be trimmed adjacent the outer surface of the outer sleeve as desired.

The assembly just describe may be accomplished with the optical fiber 46 pulled back from the first end of the optical fiber 40. In another embodiment, the optical fiber may be completely removed from the cable 40, and reinserted after the cable and anchor are mounted to one another. This allows placing the empty buffer tube 48 through the inner sleeve 10, and trimming the buffer tube to the desired length with respect to the first end 12 of the inner sleeve. The buffer tube may be flush with the first end of the inner sleeve, may extend a desired length beyond the first end 12 (as illustrated in FIGS. 1 and 2), or may extend only part way through the passage 16 from the second end 14 towards the first end 12 of the inner sleeve 10. After trimming the buffer tube 48 to the desired length, the optical fiber 46 may then be threaded through the buffer tube until the optical fiber extends the desired amount beyond the anchor inner sleeve 10.

It is desirable to have a secure structural engagement between the anchor and the strength member. This allows the strength member to carry tensile loads applied to the anchor while protecting the optical fiber 46 from being damaged by tension. In an exemplary embodiment, the optical fiber 46 may move transversely within the jacket and anchor without significantly adversely affecting the signal transmitting capability of the optical fiber.

The structural engagement between the anchor and the strength member 50 may occur through any one or combination of the following. The strength member may be engaged by compression between the outer surface 18 of the inner sleeve and the cable passage 36 the outer sleeve. At the inner sleeve, this could be along all or a portion of the outer surface, at the protrusions 20 if present, and/or at the shoulder 27. This compression between the inner and outer sleeves may be at that portion of the strength member between the outer surface 18 of the inner sleeve and the inside of the jacket. In such case, the compression of the outer sleeve is through the jacket 44. If the strength member extends outside the jacket and through the cable passage 36, the compression may be between the cable passage 36 and the outside of the jacket 44. In such case, the compression of the inner sleeve is through the jacket. The strength member 50 may be structurally engaged with the anchor by compression between the first end of the jacket and the flange wall 28 of the inner sleeve. The strength member may be structurally engaged by compression between the first end 32 of the outer sleeve and the flange wall 28 of the inner sleeve. The strength member 50 may be looped around or tied to the inner sleeve 10, such as at the shoulder 27 or at any other suitable location.

Figure 4:
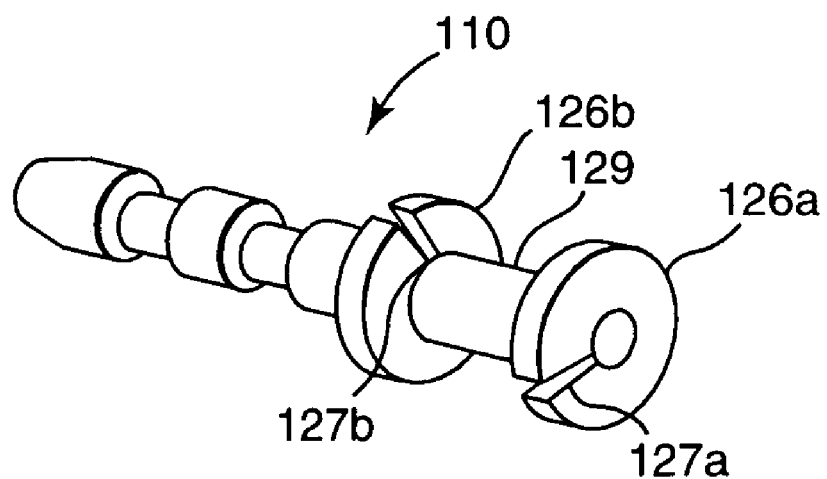
FIG. 4 is an isometric view of another exemplary anchor inner sleeve.

Another exemplary inner sleeve 110 is illustrated in FIG. 4. The sleeve 110 may have many of the same features and may be implemented in the same way as sleeve 10 described above, with the following differences. Inner sleeve 110 includes a first flange 126a and a second flange 126b. Between the two flanges is a spool 129. The first flange 126a may have a first slot 127a extending from the outer end of the flange to the spool. The second flange 126b may have a second slot 127b extending from the outer end of the flange to the spool. In this embodiment, the strength member 50 may be inserted through the slot 127b in the second flange 126b. The strength member 50 may be structurally engaged by looping the strength member around the spool 129, and by optionally tying the strength member in a knot around the spool. The outer sleeve may be configured to engage with the rear surface of the second flange, may extend over the second flange, may engage with the rear surface of the first flange, or may extend over the first flange.

The inner and outer sleeve of the anchor may be conveniently machined or formed from any suitable metal or alloy, such as brass, stainless steel, copper, and aluminum. Other suitable materials include high strength molded plastic, such as Ultem™, Valox™, and Lexan™, all available from GE Plastics, and ABS.

In an exemplary embodiment, an adhesive may be applied when anchoring the fiber optic cable. The adhesive can help manage the filaments of the strength member 50, and can structurally engage the strength member with the anchor. For example, the adhesive may be applied to the strength member 50 in the area of the first end of the jacket 46 prior to pushing the outer sleeve into its final position relative to the inner sleeve. Adhesive may be applied to the outer surface 18 of the inner sleeve 10 prior to inserting it into the jacket 46. Adhesive may be applied to the cable passage 36 of the outer sleeve, and/or to the outside of the jacket prior to pushing the outer sleeve into its final position. The adhesive may provide additional structural engagement to the compression described above. The adhesive may be chosen depending on the material of the strength member, the jacket, the inner sleeve and the outer sleeve. Exemplary adhesives include cyanoacrylates, such as 3M™ Pronto™ Instant Adhesives CA8 and CA100 from 3M Company, St. Paul, Minn.; Loctite™ 380 and 480 Instant Adhesives, from Henkel Loctite Corporation, and epoxies.

Figure 3:
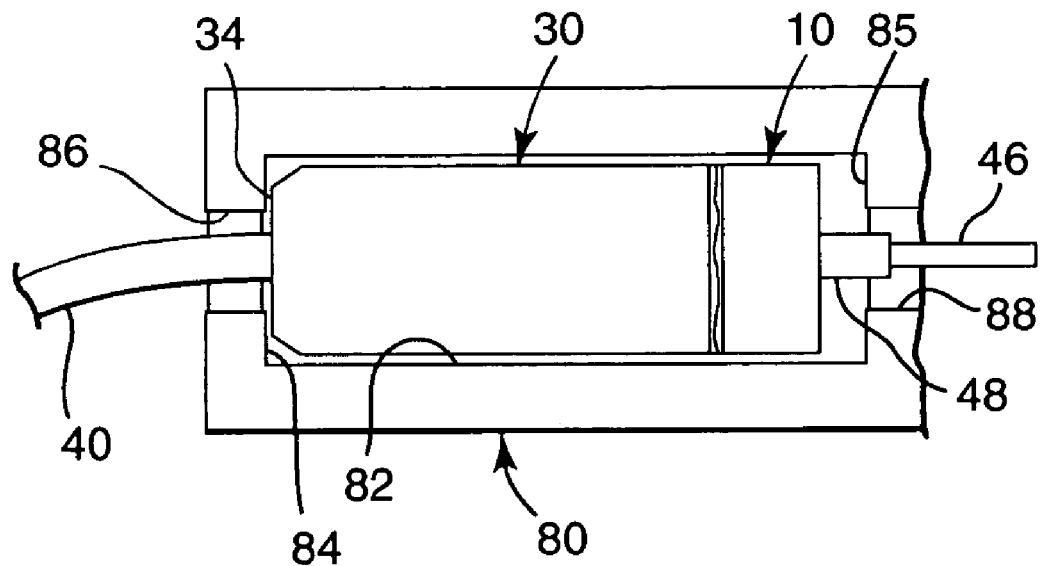
FIG. 3 is a top view of an exemplary anchored fiber optic cable mounted in an exemplary housing.

An anchored cable according to the present invention is well suited for convenient mounting in a housing 80 as illustrated in FIG. 3. The housing may be a portion of any desired device useful with fiber optic cables. For example, the housing 80 may be a portion of a fan-out, a shuffle, or an optical connector. An exemplary fan-out assembly is described in published PCT application W003/087913. An exemplary fan-out assembly is commercially available as MTP™ MPO Multi-Fiber Fan-Out Cable Assembly, from 3M Company, Austin, Tex. An exemplary shuffle is described in U.S. Pat. No. 6,556,754. An exemplary optical connector is commercially available as an MTP™ Connector from US Connect, Hickory, N.C.

Exemplary housing 80 of FIG. 3 includes an anchor cavity 82. The anchor cavity 82 is sized and configured to engage with the anchor of the present invention. The housing includes an inlet slot 86 that allows the fiber optic cable 40 to enter the housing 80 when the anchor is mounted in the anchor cavity. The housing also includes an outlet slot 88 that allows the optical fiber 46 to exit the anchor cavity 82 for connection as desired with an optical device. The anchor cavity includes a first shoulder 84 that is configured to engage with the anchor in such as way as to prevent the anchor from exiting the cavity 82 through the inlet slot 86. The anchor cavity also includes a second shoulder 85 configured to engage with the anchor in such a way as to prevent the anchor from exiting the cavity through the outlet slot 88. In an exemplary embodiment, the first shoulder 84 forms the inlet slot 86 to be smaller than the second end 34 of the outer sleeve, and the second shoulder 85 forms the outlet slot 88 to be smaller than the fist end of the anchor inner sleeve 10. The housing may be a two-piece housing such that the two pieces may be secured together, such as with bolts, after the anchor is placed within the anchor cavity 82. The housing 80 may have a plurality of anchor cavities 82 to accommodate a plurality of anchored cables.

When the anchored cable is mounted in the housing 80 as shown in FIG. 3, some of the advantages of the present invention are apparent. If tension is applied to the cable 40 or to the housing in a way that would tend to pull the cable through the inlet slot 86 of the housing, the anchor will contact the first shoulder 84 to prevent the cable from exiting the housing. Because the strength member 50 is structurally engaged with the anchor, the strength member will carry the tension and help prevent the tension from adversely affecting the optical fiber 46. If a force is applied through the cable that would tend to push the anchor through the outlet slot 88, the second shoulder will prevent the anchor from moving significantly in that direction. That will help prevent harmful bending of the optical fiber 46, and help avoid violating the minimum bend radius for the optical fiber.

The anchor of the present invention allows the cable to have the anchor mounted thereon, and be structurally engaged with the strength member, prior to being installed in the housing. The anchor may be conveniently mounted on the cable without use of tools, and in particular without the need to crimp the outer sleeve onto the cable. The anchored cable may then be easily mounted in the housing, without having to crimp the anchor onto the housing. This allows the anchor to be mounted with the housing without having to provide room at the housing to apply a crimping tool. This also allows for a housing that may have a plurality of cables mounted therein, in close proximity to one another.

The second end of the cable 40 may have mounted thereon an anchor according to the present invention. Such anchor may be mounted in a housing of an optical device as just described with respect to the first end of the cable. In such a case, the same advantages with regard to minimizing tension in the optical fiber 46 and bending of the optical fiber 46 may be attained as described with regard to the first end of the cable 40. The second end of the cable may have mounted thereon any desired optical connector, or may be connected with any desired optical device.

What is claimed is:

1. An anchored fiber optic cable and housing assembly, comprising:
    a fiber optic cable comprising a strength member and a jacket around said strength member, wherein said cable includes a first end and a second end;
    an anchor mounted on said cable at said first end, said anchor including an inner sleeve and an outer sleeve, wherein said strength member includes a first end at said first end of said cable structurally engaged with said anchor, wherein sad strength member extends from within said jacket at said first end of said cable, over said jacket towards said second end of said cable, between said jacket and said anchor outer sleeve and
    a housing, said housing comprising an anchor cavity and a cable inlet and an optical fiber outlet, said anchor cavity comprising a first shoulder and second shoulder for engaging with said anchor, wherein, said anchor is mounted in said housing cavity between said first shoulder and second shoulder and said cable extends through said cable inlet, and wherein said anchor cavity first shoulder is engaged with said anchor to prevent said anchor from exiting said housing through said cable inlet, and wherein said anchor cavity second shoulder is engaged with said anchor to prevent said anchor from exiting said housing through said optical fiber outlet.

2. The anchored fiber optic cable and housing assembly of claim 1, wherein said fiber optic cable includes an optical filter in said jacket.

3. The anchored fiber optic cable and housing assembly of claim 2, wherein said strength member comprises a plurality of filaments.

4. The anchored fiber optic cable and housing assembly of claim 3, wherein said filaments comprise aramid filaments.

5. The anchored fiber optic cable and housing assembly of claim 2, wherein said strength, member is structurally engaged between said anchor inner and outer sleeves by compression between said inner and outer sleeves.

6. The anchored fiber optic cable and housing assembly of claim 2, wherein said anchor outer sleeve includes a first end oriented towards said first end of said cable, wherein said anchor inner sleeve includes a first end oriented towards said first end of said cable and a front flange extending from said first end, and wherein said strength member extends from said first end of said cable and is structurally engaged between said first end of said outer sleeve and said inner sleeve front flange.

7. The anchored fiber optic cable and housing assembly of claim 2, wherein:
    said anchor inner sleeve includes a first end and, a second end, said second end extending toward said second end of said cable, an optical fiber passage extending through said inner sleeve, and an outer surface; and
    wherein said optical fiber extends through said optical fiber passage beyond said first end of said inner sleeve, and wherein said inner sleeve second end extends inside said jacket of said fiber optic cable jacket.

8. The anchored fiber optic cable and housing assembly of claim 7, wherein:
    said anchor outer sleeve includes a first end and a second end, said second end extending toward said second end of said fiber optic cable, and a cable passage extending through said anchor outer sleeve, and
    wherein, said fiber optic cable extends through said outer sleeve cable passage, such that said jacket of said cable is engaged by compressive force between said anchor inner and outer sleeves.

9. The anchored fiber optic cable and housing assembly of claim 2, wherein said optical fiber may move transversely within said jacket without significantly adversely affecting the signal transmitting capability of said optical fiber.

10. A method of anchoring a fiber optic cable in a housing, wherein said cable comprises a strength member and a jacket around the strength member, and wherein said housing comprises an anchor cavity having a first shoulder and a second shoulder for engaging with an anchor, a cable inlet, and an optical fiber outlet, said method comprising the steps of:
    placing an exposed portion of the strength member along the outside of the jacket from a first end of the cable extending toward a second end of the cable;
    placing an anchor inner sleeve within the jacket at the first end of the cable;
    placing an anchor outer sleeve over the jacket and thereby structurally engaging the strength member by compressive force between the anchor inner and outer sleeves wherein placing the anchor outer sleeve over the jacket also includes placing the anchor outer sleeve over the exposed portion of the strength member;
    thereafter mounting the anchor in the cavity of the housing between said first shoulder and second shoulder such that the cable extends through the cable inlet of the housing, wherein the anchor cavity fist shoulder is engaged with said anchor to prevent said anchor from exiting said housing through the cable inlet, and wherein said anchor cavity second shoulder is engaged with said anchor to prevent said anchor from exiting said housing through said optical fiber outlet.

11. The method of claim 10, wherein the fiber optic cable includes an, optical fiber in the jacket.

12. The method of claim 11, wherein said anchor and housing are configured such that said anchor cannot exit through said optical fiber outlet.

13. The method of claim 11, wherein the mounting step can be accomplished without the use of tools.

14. The method of claim 11, wherein the mounting step can be accomplished without crimping.

* * * * *

UNITED STATES PATENT AND TRADEMARK OFFICE
CERTIFICATE OF CORRECTION

PATENT NO. : 6,953,287 B2 Page 1 of 1
DATED : October 11, 2005
INVENTOR(S) : Cox, Larry R.

It is certified that error appears in the above-identified patent and that said Letters Patent is hereby corrected as shown below:

Column 6,
Line 65, delete "fist" and insert -- first --.

Column 7,
Line 51, delete "sad" and insert -- said --.
Line 54, after "sleeve" insert -- ; --.
Line 58, after "wherein" delete ",".

Column 8,
Line 3, delete "filter" and insert -- fiber --.
Line 10, after "strength" delete ",".
Line 25, after "and" delete ",".
Line 39, after "wherein" delete ",".
Line 62, after "sleeves" insert -- , --.

Column 9,
Line 2, delete "fist" and insert -- first --.
Line 9, after "an" delete ",".

Signed and Sealed this

Fourth Day of April, 2006

JON W. DUDAS
*Director of the United States Patent and Trademark Office*